(12) United States Patent
Kalakodimi et al.

(10) Patent No.: US 11,597,846 B2
(45) Date of Patent: Mar. 7, 2023

(54) METHODS AND COMPOSITIONS FOR INHIBITING CORROSION ON METAL SURFACES

(71) Applicant: CHEMTREAT, INC., Glen Allen, VA (US)

(72) Inventors: Rajendra Prasad Kalakodimi, Glen Allen, VA (US); Raymond Post, Langhorne, PA (US); Douglas A Godwin, Fairhope, AL (US); James Hatcher, Zionsville, IN (US)

(73) Assignee: CHEMTREAT, INC, Glen Allen, VA (US)

(*) Notice: Subject to any disclaimer, the term of this patent is extended or adjusted under 35 U.S.C. 154(b) by 356 days.

(21) Appl. No.: 16/770,028

(22) PCT Filed: Dec. 4, 2018

(86) PCT No.: PCT/US2018/063753
§ 371 (c)(1),
(2) Date: Jun. 4, 2020

(87) PCT Pub. No.: WO2019/113005
PCT Pub. Date: Jun. 13, 2019

(65) Prior Publication Data
US 2021/0171781 A1 Jun. 10, 2021

Related U.S. Application Data

(60) Provisional application No. 62/594,335, filed on Dec. 4, 2017.

(51) Int. Cl.
C09D 5/08 (2006.01)
C09D 1/00 (2006.01)
(Continued)

(52) U.S. Cl.
CPC ............... *C09D 5/084* (2013.01); *C09D 1/00* (2013.01); *C23F 11/04* (2013.01); *C23F 11/18* (2013.01)

(58) Field of Classification Search
CPC . C09D 5/084; C09D 1/00; C23F 11/04; C23F 11/18; C23F 11/08; C02F 5/083; C02F 2103/16; C23C 22/62
See application file for complete search history.

(56) References Cited

U.S. PATENT DOCUMENTS 4,512,552 A 4/1985 Katayama et al.
5,989,322 A * 11/1999 Riggs, Jr. ................ C23F 11/18
106/14.44

(Continued)

FOREIGN PATENT DOCUMENTS

WO 2015/065733 A1 5/2015

OTHER PUBLICATIONS

Ai et al. "Passivation Characteristics of Alloy Corrosion-Resistant Steel Cr10Mo1 in Simulating Concrete Pore Solutions: Combination Effects of pH and Chloride" Materials vol. 9(9), p. 749, Jul. 2, 2016 (Jul. 2, 2016).

(Continued)

*Primary Examiner* — Pamela H Weiss
(74) *Attorney, Agent, or Firm* — Oliff PLC

(57) ABSTRACT

Methods and compositions for inhibiting corrosion of a metal product are provided. The metal product can be contacted with water that includes at least one carbonate and/or bicarbonate salt, or otherwise has components that increase the alkalinity of the water. In addition, or as an alternative, the water can include a stannous corrosion inhibitor. The water can be evaporated off of a surface of the metal product to provide a residual of the salt on the surface and/or a protective stannous film on the surface.

8 Claims, 3 Drawing Sheets

(51) Int. Cl.
*C23F 11/04* (2006.01)
*C23F 11/18* (2006.01)

(56) References Cited

U.S. PATENT DOCUMENTS

| | | | |
|---|---|---|---|
| 6,555,094 B1 | 4/2003 | Glandorf et al. | |
| 6,585,933 B1* | 7/2003 | Ehrhardt | C23F 11/149 |
| | | | 422/11 |
| 8,784,629 B2* | 7/2014 | Inbe | C25D 13/04 |
| | | | 148/279 |
| 2005/0255693 A1* | 11/2005 | Liu | C09G 1/02 |
| | | | 257/E21.304 |
| 2006/0118761 A1* | 6/2006 | Stapp | C02F 5/08 |
| | | | 252/175 |
| 2008/0280800 A1* | 11/2008 | Smith | C23F 11/124 |
| | | | 510/508 |
| 2008/0287334 A1* | 11/2008 | Smith | C23G 1/22 |
| | | | 252/396 |
| 2009/0020187 A1* | 1/2009 | Russell | C09D 1/00 |
| | | | 118/58 |
| 2009/0069202 A1* | 3/2009 | Stapp | C23F 11/08 |
| | | | 507/224 |
| 2010/0178198 A1* | 7/2010 | Moisan | A61L 2/14 |
| | | | 422/23 |
| 2010/0243465 A1* | 9/2010 | Inbe | C23C 22/83 |
| | | | 205/184 |
| 2016/0145442 A1* | 5/2016 | Kalakodimi | C23C 22/68 |
| | | | 427/327 |
| 2016/0215400 A1* | 7/2016 | Kalakodimi | C23F 11/08 |
| 2017/0013034 A1 | 1/2017 | Chung et al. | |
| 2017/0130340 A1* | 5/2017 | Kalakodimi | C23F 11/08 |

OTHER PUBLICATIONS

Corrosiondoctors.org "Corrosivity of a Water and Saturation Indices" https://corrosion-doctors.org/Cooling-Water-Towers/corrosivity.htm Jul. 24, 2000 (Jul. 24, 2000).

Metalsupermarkets.com "Difference between annealing and tempering" 6 https://www.metalsupermarkets.com/difference-annealing-tempering/ May 9, 2016 (May 9, 2016).

"International Searching Authority", Notification of Transmittal of the International Search Report and the Written Opinion of the International Searching Authority, or the Declaration, dated Feb. 15, 2019, pp. 8.

Jun. 21, 2021 Extended European Search Report issued in European Patent Application No. 18 886 847.5.

* cited by examiner

METHODS AND COMPOSITIONS FOR INHIBITING CORROSION ON METAL SURFACES

This application claims the benefit of U.S. Provisional Application No. 62/594,335, filed Dec. 4, 2017. The disclosure of the prior application is hereby incorporated by reference herein in its entirety.

TECHNICAL FIELD

This disclosure relates generally to the field of water treatment in metal production processes, such as those found in steelmaking facilities.

BACKGROUND

When storing or transporting surface sensitive products such as steel products and non-ferrous materials such as copper and brass, environmental conditions can create undesirable corrosion and/or staining of the finished product. Improper or inadequate treatment of the metal prior to coiling or finishing will impact the degree of corrosion and/or staining during storage or transport. This costs manufacturers millions of dollars in lost or downgraded product over the years.

SUMMARY

Corrosion, such as pitting corrosion, and staining of the metal surface remain persistent problems. Metal manufacturers have not approached solutions to these problems with chemical surface treatments. To date, there have not been robust solutions based on the conventional non-chemical approaches.

In accordance with one aspect of the present invention, there is provided a method for inhibiting corrosion of a metal product that includes (i) contacting a surface of the metal with water having at least one salt selected from the group consisting of carbonates, bicarbonates, and combinations thereof; and (ii) evaporating the water off of the surface so that a residual of the at least one salt remains on the surface. The method can optionally include a step of contacting the surface of the metal with water that includes a stannous corrosion inhibitor.

In accordance with another aspect, there is provided a method for inhibiting corrosion of a metal product that contacts a water stream during production of the metal product. The method can include (i) increasing the alkalinity of the water stream by adding at least one salt to the water stream; and (ii) then evaporating water off of the metal product so that a residual of the at least one salt remains on a surface of the metal product.

In accordance with another aspect, there is provided a method for inhibiting corrosion of a metal product that includes (i) contacting a surface of the metal with water that includes a stannous corrosion inhibitor, where the surface of the metal has a temperature of at least 500° C. immediately before the surface is contacted with the water; and (ii) then evaporating the water off of the surface and forming a Sn (IV) film on the surface.

In accordance with yet another aspect, there is provided an aqueous composition that includes (i) from 0.1 wt. % to 25 wt. % of a stannous salt; and (ii) from 0.5 wt. % to 25 wt. % of at least one salt selected from the group consisting of carbonates, bicarbonates, and combinations thereof.

DETAILED DESCRIPTION OF EMBODIMENTS

Figure 1:
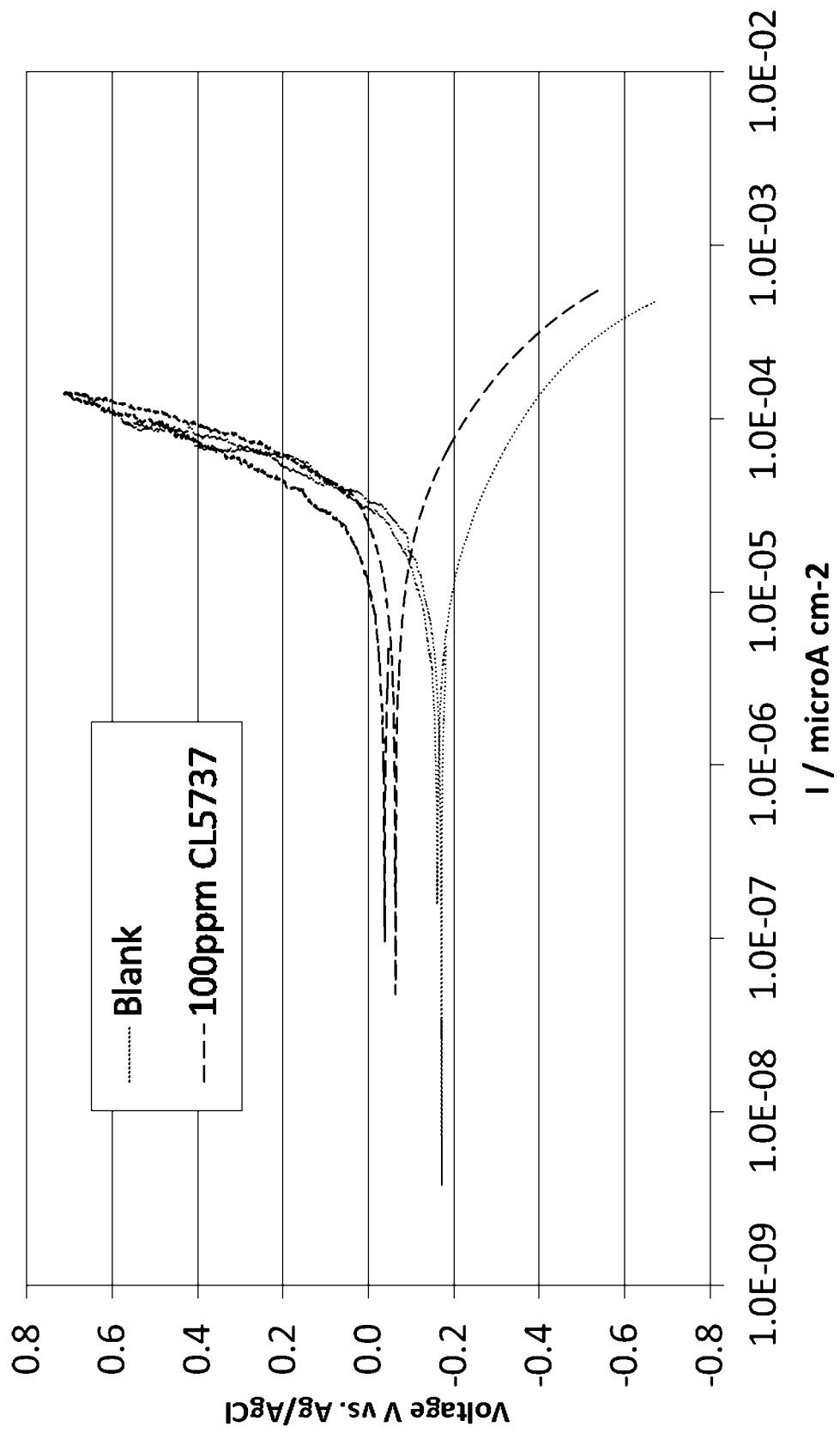
FIG. 1 is a graph showing the cyclic polarization curves of test steel coupons.

This disclosure describes methods and compositions for protecting surface sensitive materials from corrosion that may occur during manufacturing, storage, and transportation. The surface sensitive material can be metals such as steel products, galvanized steels, and non-ferrous materials such as copper, brass, aluminum, etc.

In one aspect, the invention mitigates corrosion problems by treating water that contacts the metal during its production. Water can be sprayed onto metal surfaces, or otherwise be contacted with metal surfaces, during the production of metal products. For example, water is often used as a cooling medium to cool the metal. But the water that is used for cooling typically contains various minerals such as calcium, magnesium, chlorides and sulfates, etc. Chlorides and sulfates can be very corrosive to metal surfaces such as steel. In some processes, the amount of chlorides in the water that contacts the metal surface can be in the range of 10 ppm to 1,000 ppm, from 50 ppm to 500 ppm, and from 100 ppm to 250 ppm. The amount of sulfates in the water that contacts the metal surface can be in the range of from 2 ppm to 500 ppm, from 5 ppm to 250 ppm, or from 10 ppm to 100 ppm.

Once the water is evaporated or dried off of the metal surface, the chlorides and sulfates can be retained as a residual on the metal surface, e.g., as residual salts. The chloride and sulfate salts are known to be deliquescent salts, meaning, they quickly adsorb humidity from the air and form a highly concentrated liquid solution on the surface of the metal. Rain water and dew are slightly acidic forms of pure water (pH~5) which when combined with atmospheric $CO_2$, form carbonic acid, as well as stronger acids from adsorption of sulfur and nitrogen oxides. The combination of acidic water with chlorides and sulfates can cause very aggressive corrosion on the metal surface that degrades protective oxide coatings that naturally form on the surface, e.g., iron oxide coatings that form on steel surfaces. As the acidic chloride and sulfate solutions attack the metal, the pH of the solution can further be depressed by metal hydrolysis. For example, in the case of iron based metals, the Fe reacts with OH and leaves the water enriched in $H^+$. At low pH, the $H^+$ concentration is sufficient to become the dominant electron acceptor instead of oxygen reduction.

As described in detail below, in one aspect, these corrosion issues can be substantially mitigated by (i) increasing the alkalinity of water that contacts the metal surface; or (ii) by adding a stannous based passivating chemistry to the water; or (iii) a combination of both of these treatments.

The alkalinity of water can be increased by introducing into the water carbonate and bicarbonate salts, such as, but not limited to, sodium, potassium, magnesium, and calcium carbonate/bicarbonate. The alkalinity can also be increased by using chemistries, such as, but not limited to, hydroxide salts, amines, etc. The salts can be dissolved in the water as a solution, can be suspended in the water, or a combination of both. It is believed that an increase in alkalinity of the water leaves residual components on the metal surface that prevent corrosion attributable to chlorides and sulfates and/or to subsequent contact of the metal surface with acidic water or water vapor.

Without intending to be bound by theory, it is believed that when these salts, such as bicarbonate/carbonate salts, are subjected to high temperatures on the metal surface, they will produce residual products that create a local alkaline environment on the metal surface that protects against corrosion from acidic conditions. In this regard, when bicarbonate salts are exposed to high temperature, they release $CO_2$, forming carbonates or oxides. For example, sodium carbonate decomposes to sodium oxide ($Na_2O$) beginning at about 400° C., which is in the range of temperatures metal is typically exposed to during processing, e.g., the temperature at which steel is coiled. $Na_2O$ also adsorbs moisture from the air to become caustic soda.

It is believed that the high pH environment created by the sodium, calcium, and potassium carbonates and hydroxides can counter the low pH effects of atmospheric $CO_2$ and "acid rain". Unexpectedly, the residuals of the carbonate/bicarbonate salt thus can remain on the metal surface even after being exposed to high temperatures and can create basic conditions that prevent corrosion when the metal surface is later contacted with moisture, e.g., during storage and transportation (particularly overseas shipping). At high pH, metal surfaces generally become much less corrosive.

A corrosivity index can be developed based on the amount of chlorides and sulfates in the water whereby the amount of alkalinity that the water needs can be determined based on the amount of chlorides and sulfates in the water. The concentration of alkalinity in the water stream that contacts the metal surface can be controlled to be from about 5 ppm to 1,500 ppm, from 25 ppm to 1,000 ppm, from 50 ppm to 500 ppm, and from 100 ppm to 400 ppm. "Alkalinity" as used herein refers to M-alkalinity. The alkalinity can be provided by mixing a treatment composition with the water that includes at least one carbonate or bicarbonate salt. The treatment composition can be provided as an aqueous composition (i.e., containing mostly water). The salts can be present in the treatment composition in amounts of from 0.1 to 25 wt. %, 1 to 20 wt. %, or 5 to 15 wt. %.

Separately or in addition to the above step, a stannous corrosion inhibitor can be added to the water which contacts the metal surface. Stannous salts are known to inhibit corrosion but, unlike more conventional corrosion inhibitors, the mechanism by which the stannous salts inhibited corrosion has not been well understood. Without intending to be bound by theory, it is believed that stannous salts can form of a tenacious protective layer on metal surfaces. Stannous ions (Sn (II)) in the water solution are drawn to the active metal surfaces that are losing electrons as they oxidize or are forced into solution by electric potentials. The positively charged tin ion is drawn to the negative surfaces, and reduces the oxidized ions (rust and corrosion) and oxidizes itself to stannic Sn(IV) state, which is insoluble. This results in the formation of an inactive layer Sn(IV) on the metal surface, which protects the metal surface from further corrosion.

The stannous salt may be, for example, stannous chloride, stannous sulfate, stannous bromide, stannous oxide, stannous phosphate, stannous pyrophosphate, stannous tetrafluroborate, or combinations of any of these salts.

The concentration of the stannous salt in the water stream that contacts the metal surface can be controlled to be in the range of from about 0.1 to 1000 ppm, from about 0.5 to 50 ppm, or from about 1.5 to 10 ppm.

In one aspect, the stannous treatment composition that is added to the water can be an aqueous solution. The amount of stannous salt in the treatment composition can be in the range of from 0.1 wt. % to 25 wt. %, from 1 wt. % to 20 wt. %, or from 5 wt. % to 10 wt. %. The amount of tin (from the stannous salt) in the corrosion inhibitor composition can range from 0.05 wt. % to 15 wt. %, from 0.1 wt. % to 10 wt. %, or from 1 wt. % to 5 wt. %.

The treatment composition can also include at least one chelating agent selected from the group consisting of citric acid, azole based copper corrosion inhibitors such as benzotriazole and 2-Butenedioic acid (Z), halogenated azoles and their derivatives, scale inhibitors and dispersants selected from the group consisting of one or more of unsaturated carboxylic acid polymers such as polyacrylic acid, homo or co-polymaleic acid (synthesized from solvent and aqueous routes); acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS; phosphonates and phosphinates such as 2-phosphonobutane-1,2,4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetriamine penta(methylene phosphonic acid) (DETPMP), phosphinosuccinic oligomer (PSO); salts of molybdenum and tungsten including, for example, nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA), a biocide, and combinations thereof.

The treatment composition can also include a secondary corrosion inhibitor, which comprises other metal ions with multiple oxidation states, ortho phosphates, pyro phosphates, molybdates, nitrites, of one or more of unsaturated carboxylic acid polymers such as polyacrylic acid, homo or co-polymaleic acid (synthesized from solvent and aqueous routes); acrylate/2-acrylamido-2-methylpropane sulfonic acid (APMS) copolymers, acrylate/acrylamide copolymers, acrylate homopolymers, terpolymers of carboxylate/sulfonate/maleate, terpolymers of acrylic acid/AMPS; phosphonates and phosphinates such as 2-phosphonobutane-1,2, 4-tricarboxylic acid (PBTC), 1-hydroxy ethylidene-1,1-diphosphonic acid (HEDP), amino tris methylene phosphonic acid (ATMP), 2-hydroxyphosphonocarboxylic acid (HPA), diethylenetriamine penta(methylene phosphonic acid) (DETPMP), phosphinosuccinic oligomer (PSO); salts of molybdenum and tungsten including, for example, nitrates and nitrites; amines such as N,N-diethylhydroxylamine (DEHA), diethyl amino ethanol (DEAE), dimethylethanolamine (DMAE), cyclohexylamine, morpholine, monoethanolamine (MEA); azoles such as tolyltriazole (TTA), benzotriazole (BZT), butylbenzotriazole (BBT), halogenated azoles, their salts, and combinations thereof.

One or both of the alkalinity and stannous treatment compositions can be added to the water that contacts the metal surface during or after production of a metal product. In one aspect, these treatment compositions can be added to cooling water that contacts the metal surface in a step that cools the metal, e.g., by at least 50° C. or 100° C., such as an annealing step in steelmaking. The compositions can be added during a stage where the temperature of the metal is high enough to evaporate off substantially all of the water and leave behind the stannous film and/or residuals of carbonate/bicarbonate salts. Such metal surface temperatures include those of at least 500° C., at least 800° C., or over 1000° C., as measured immediately before the surface is contacted with water. In one aspect, it was surprisingly discovered that the stannous film can form and remain intact even when subjected to these high temperatures, as it was expected that the film would degrade.

In accordance with some aspects, the water stream that contacts the metal can include both a stannous salt and a carbonate/bicarbonate salt, and, likewise, the treatment composition that is added to the water stream can include both of these components in the respective amounts identified above. In other aspects, these components can be added in separate stages where one water stream contacting the metal includes a stannous salt and another water stream that contacts the metal includes a salt that increases the alkalinity of the water. Advantageously, the corrosion-resistance effects of the stannous corrosion inhibitor composition are substantially more pronounced under high alkalinity conditions and have unexpectedly good performance.

One useful application of this invention is exemplified in the description below in connection with treating water that contacts steel during a steel making process.

The manufacturing process for steel production is time consuming. Conversion from liquid steel to solidified thick or thin slabs occurs in the continuous caster. The slabs are either cooled and then charged into a reheat furnace or directly charged from the caster into a furnace. Once the product is heated to the proper rolling temperature, it is removed from the furnace and introduced into the Rolling or Hot Strip Mill. The Rolling or Hot Strip Mill includes roughing stands and/or finishing stands which reduce the thickness of the product to the desired gauge of the finished product (strip or plate). After the gauge has been set, the product may undergo water cooling in a laminar or accelerated cooling process in order to finalize the desired metallurgical properties prior to packaging. This cooling process cools the product from a starting temperature of approximately 600° C.-1000° C., or 700° C.-800° C., depending on desired rolling properties. The water wall cools the strip temperature with a series of low pressure nozzle jets at both the bottom and the top of the strip surface.

The steel can be cooled to a set temperature range based on desired metallurgical properties (typically 400° C.-800° C.) by multiple stages of water on the laminar table prior to being coiled. Additional water is also applied in the coiling process to maintain the integrity of the coil machinery. The water that has been sprayed on the steel for cooling typically contains various minerals such as calcium, magnesium, chlorides and sulfates, etc. As indicated above, chlorides and sulfates are especially known to be very corrosive to steel. These minerals can combine to form salts, which, through evaporation, can remain on the metal surface even at such elevated temperatures. Hardness ions, calcium and magnesium, combine with chloride ions in the water and can form calcium chloride and magnesium chloride salts, which are left on the strip due to evaporation at high temperatures. That is, in steel production, as well as other metal production processes, water containing salts dries out on the metal surface.

Then, while being transported long-distance, the salts adsorb humidity from the air and form a concentrated liquid solution on the surface of the metal, which in turn causes corrosion/staining on the steel surface. This combination of factors leads to rapid rusting and degradation of the steel surface. This has resulted in not only aesthetic issues, but has resulted in costly product losses amounting to millions of dollars in wastage of the steel products.

To combat this problem, one or both of the alkalinity and stannous treatment compositions described above can be added to the cooling water at the laminar table. Based on the high temperature of the steel the water will steam off. It is believed that the carbonates decompose to sodium oxide, for example, beginning at about 400° C., which is lower than the coiling temperature of the steel. $Na_2O$ also adsorbs moisture from the air to become caustic soda, which can create a high pH environment to counter the low pH effects of atmospheric $CO_2$ and "acid rain". This mechanism, optionally together with forming a stannous film on the metal surface, can provide a very effective mechanism for inhibiting corrosion and staining of steel products.

EXAMPLES

In a first example, stainless steel coupons were passivated for about 1 hour in a solution containing sodium bicarbonate in an amount corresponding to 250 ppm of alkalinity as $CaCO_3$ and 50 ppm of stannous corrosion treatment composition (which includes about 3-3.5 wt. % Sn). The water also included 75 ppm Ca as $CaCO_3$, 25 ppm Mg as $CaCO_3$, 130 ppm Chlorides and 15 ppm sulfates. These components were added to mimic water compositions that might be present in many steel production facilities. The coupons were then placed in a furnace at 650° C. for one hour, which evaporates the water on the coupons. A blank coupon, which was not exposed to any treatment program was also used for comparison. After the exposure to high temperature, one set of coupons was used to run electrochemical cyclic polarization and the other set was exposed to a humidity chamber for 12 hours.

FIG. 1 shows the cyclic polarization curves of the coupons after exposure to high temperature, where the y-axis is a voltage compared to a Ag/AgCl reference electrode, and the x-axis is current. Passivation of the metal surface manifests itself as a more positive potential under this test. As can be seen in FIG. 1, at the flat part of the curves, the treated coupon is more anodic than the blank, which indicates that the stannous based treatment program provides a passive film on the surface of the metal under alkaline conditions and even after being subjected to high temperatures.

Figure 2:
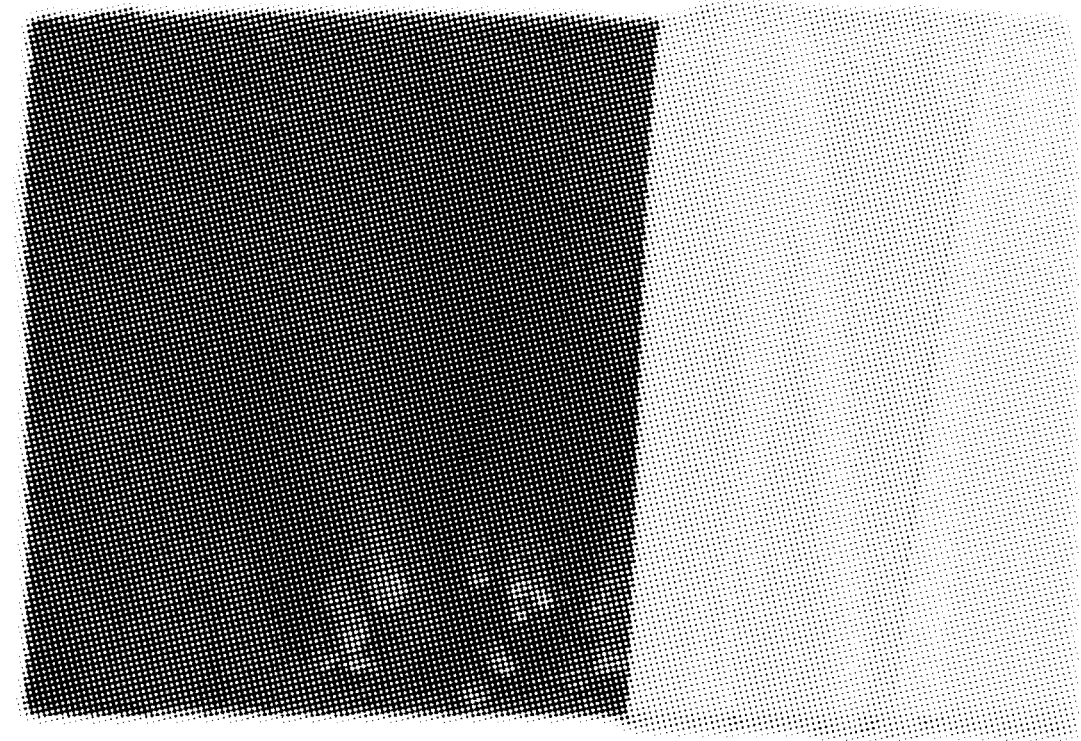
FIG. 2 is a photograph showing the coupons after the cyclic polarization study.
Figure 2:
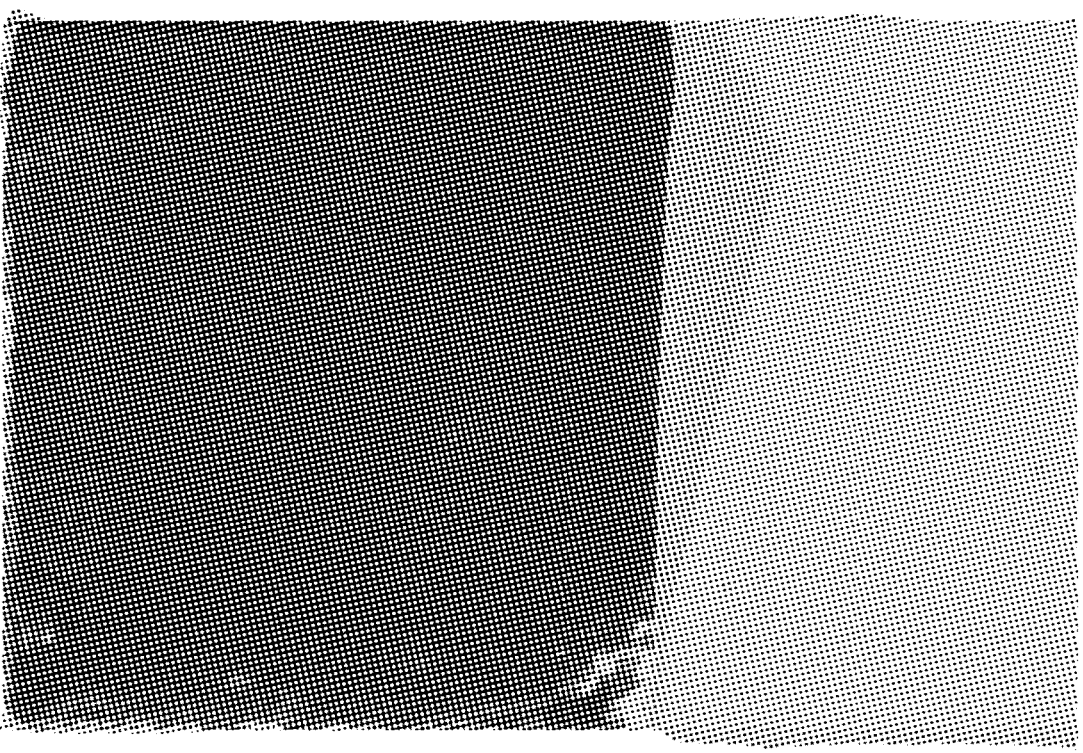

FIG. 2 is a photograph of the coupons after the cyclic polarization studies. It is clear from FIG. 2 that the coupon with no treatment program had corrosion/staining on the coupon surface, while the coupon which was exposed to a stannous-based treatment program along with increase in alkalinity, showed a clean surface with minimal corrosion/staining.

Figure 3:
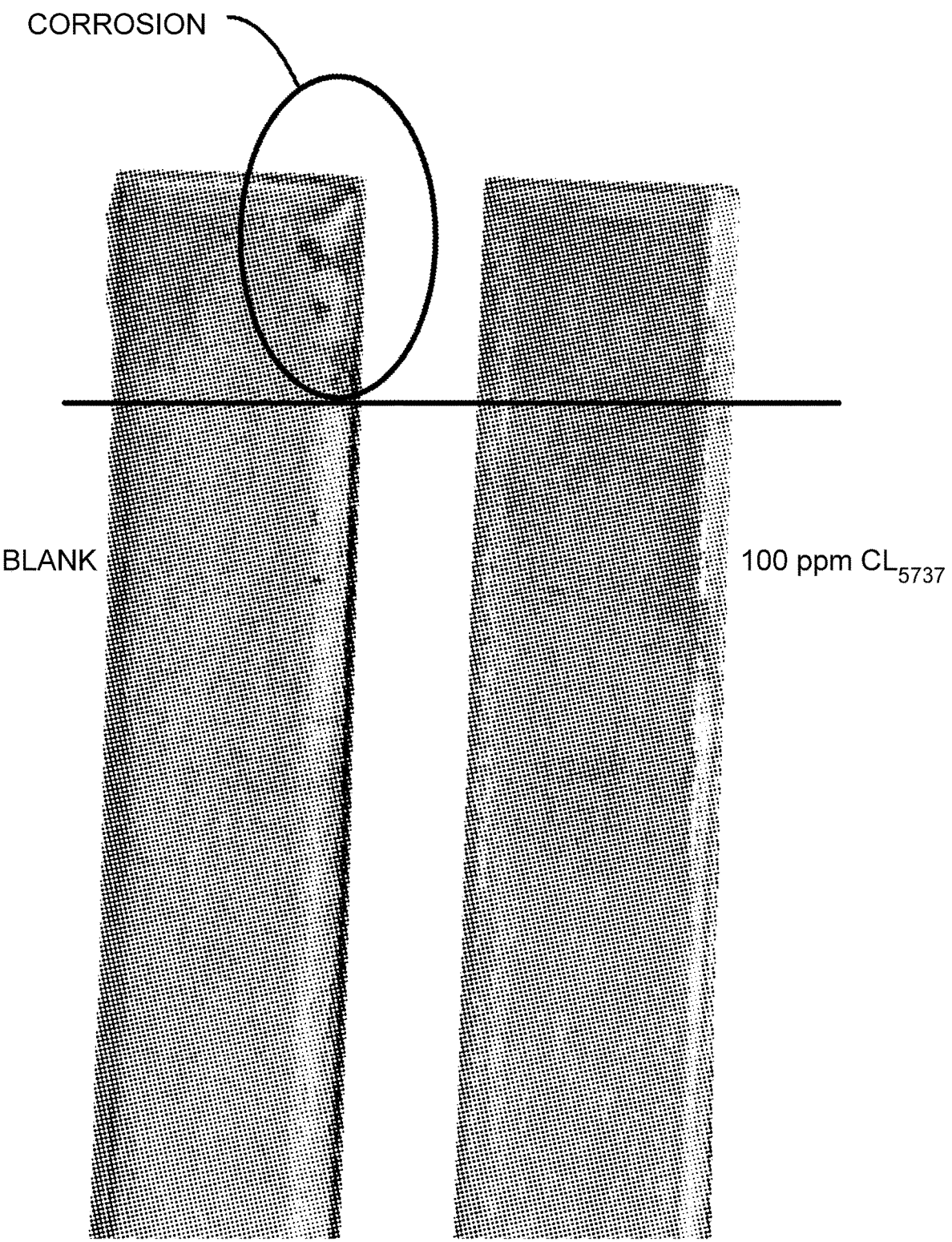
FIG. 3 is photograph showing steel coupons after being exposed to a humidity chamber for 12 hours.

FIG. 3 is a photograph of the second set of coupons that had been exposed to the humidity chamber. For the coupons in FIG. 3, a similar passivation was conducted, but the water used for passivation included 215 ppm sulfates, as compared to the Example 1, which only had 15 ppm sulfates. FIG. 3 shows the pictures of the coupons after exposing them to these passivating chemistries, followed by high temperature and humidity chamber.

It is clear from FIG. 3 that the stannous based treatment program, coupled with increased alkalinity, will protect the metal from severely corrosive conditions, including both chlorides and sulfates.

What is claimed is:

1. A method for inhibiting corrosion of a metal product, the method comprising:
providing water that has (a) at least one salt dissolved therein, the at least one salt (i) being selected from sodium carbonate, potassium carbonate, sodium bicarbonate, potassium bicarbonate, and combinations thereof, and (ii) being present in an amount corresponding to an alkalinity in a range of 2.5 ppm to 1,500 ppm, and (b) a stannous corrosion inhibitor in an amount of from 0.5 ppm to 1,000 ppm; and spraying the water onto a surface of the metal, wherein the metal is steel and the surface of the metal has a temperature that is sufficiently high to evaporate the water off of the surface so that a film of the stannous corrosion inhibitor and a residual of the at least one salt remain on the surface.

2. The method of claim 1, wherein the water that is sprayed onto the surface of the metal includes an amount of the at least one salt so that the alkalinity of the water is in the range of from 50 ppm to 1,000 ppm.

3. The method of claim 1, wherein the water that is sprayed onto the surface of the metal further includes a chloride content in the range of from 10 ppm to 1,000 ppm.

4. The method of claim 1, wherein the water that is sprayed onto the surface of the metal further includes a sulfate content in the range of from 2 ppm to 500 ppm.

5. The method according to claim 1, wherein the surface of the metal has a temperature of at least 500° C., as measured immediately before the surface is contacted with the water.

6. The method according to claim 1, wherein the surface of the metal has a temperature of at least 800° C. as measured immediately before the surface is contacted with the water.

7. The method according to claim 1, wherein the water is sprayed onto the surface during a step of annealing the steel.

8. The method according to claim 1, wherein the at least one salt is present in the water in an amount corresponding to an alkalinity in a range of 100 ppm to 500 ppm.

* * * * *